United States Patent
Kim et al.

(10) Patent No.: US 12,420,183 B2
(45) Date of Patent: Sep. 23, 2025

(54) APPARATUS AND METHOD FOR PROVIDING GAME REPLAYS

(71) Applicant: NEXON GAMES CO., LTD., Seoul (KR)

(72) Inventors: Sang Mun Kim, Seongnam-si (KR); Dong Il Jeong, Seongnam-si (KR)

(73) Assignee: NEXON GAMES CO., LTD., Seoul (KR)

( * ) Notice: Subject to any disclaimer, the term of this patent is extended or adjusted under 35 U.S.C. 154(b) by 231 days.

(21) Appl. No.: 17/993,449

(22) Filed: Nov. 23, 2022

(65) Prior Publication Data

US 2023/0166186 A1    Jun. 1, 2023

(30) Foreign Application Priority Data

Nov. 26, 2021 (KR) .......................... 10-2021-0165259
Mar. 23, 2022 (KR) .......................... 10-2022-0035940

(51) Int. Cl.
*A63F 13/497* (2014.01)
*A63F 13/52* (2014.01)
*A63F 13/837* (2014.01)

(52) U.S. Cl.
CPC ............ *A63F 13/497* (2014.09); *A63F 13/52* (2014.09); *A63F 13/837* (2014.09)

(58) Field of Classification Search
CPC ....... A63F 13/497; A63F 13/52; A63F 13/837
See application file for complete search history.

(56) References Cited

U.S. PATENT DOCUMENTS 6,699,127 B1 *  3/2004  Lobb ....................... A63F 13/45
                                                           463/43
10,286,315 B2 *  5/2019  Perlman ............. H04N 21/8173
(Continued)

FOREIGN PATENT DOCUMENTS

JP     2013-126559 A     6/2013
KR       100793311 B1    1/2008
KR     10-2244535 B1     4/2021

OTHER PUBLICATIONS

Wikipedia, "FIFA Football 2003", https://en.wikipedia.org/wiki/FIFA_Football_2003 Jul. 23, 2021, 6 pages total.
(Continued)

*Primary Examiner* — Omkar A Deodhar
(74) *Attorney, Agent, or Firm* — Sughrue Mion, PLLC (57) ABSTRACT

Disclosed herein are an apparatus and method for providing game replays. The apparatus for providing game replays includes: storage configured to store a game log for each game round of a game match including a plurality of game rounds that are performed sequentially; a controller configured to run the game round by providing a game screen of a three-dimensional game space to a plurality of players participating in the game match and also receiving control commands for characters from the plurality of players, and to, when the game round ends, generate a replay image showing changes in the location of a character corresponding to each of the plurality of players on a two-dimensional plan view of the three-dimensional game space based on the game log of the game round; and an input/output interface configured to provide the replay image to the plurality of players.

12 Claims, 7 Drawing Sheets

(56) References Cited

U.S. PATENT DOCUMENTS

| | | | |
|---|---|---|---|
| 10,913,003 B2* | 2/2021 | Miura | H04N 21/4781 |
| 2018/0350144 A1* | 12/2018 | Rathod | G06Q 20/3224 |
| 2019/0270020 A1* | 9/2019 | Miura | A63F 13/533 |
| 2020/0155944 A1* | 5/2020 | Witchey | H04L 9/3239 |

OTHER PUBLICATIONS

Yojo, "I suggest a Champions League defense", https://cafe.payer.com/monstersuperleague/405276 Mar. 1, 2021, 1 page total.

Huyuyu, "A popular boxing cartoon appears as a game", https://game.donga.com/2752/ GAMEDONGA, Jun. 19, 2004, 10 pages total.

Lee, "Nexon, TPS emphasizing three-dimensional action, 'Project D' expected to be unveiled soon", INVEN, Oct. 5, 2021 (3 pages total), https://www.inven.co.kr/webzine/news/?news=263188.

Yoon, "Nexon recruits alpha testers for PC TPS new game 'Project D'", INVEN, Nov. 11, 2021 (2 pages total), https://www.inven.co.kr/webzine/news/?news=264724.

\* cited by examiner

APPARATUS AND METHOD FOR PROVIDING GAME REPLAYS

CROSS-REFERENCE TO RELATED APPLICATION

This application claims priority from Korean Patent Application No. 10-2021-0165259 filed on Nov. 26, 2021 and Korean Patent Application No. 10-2022-0035940 filed on Mar. 23, 2022 which are hereby incorporated by reference herein in their entirety.

BACKGROUND

1. Technical Field

The embodiments disclosed herein relate to an apparatus and method for providing game replays, and more particularly to an apparatus and method for providing game replays that provide a replay image for each game round in a game including a plurality of game rounds.

2. Description of the Related Art

Three-dimensional (3D) shooting games, such as first-person shooter (FPS) games and third-person shooter (TPS) games, have been gaining popularity in Korea for a long period of time. In particular, some games that are gaining absolute popularity in Korea continue to be updated and maintain a large number of players. At the same time, new shooting games are continuously released, and are challenging the dominance of existing games.

The reason why these 3D shooting games are so popular in Korea is that the infrastructure required for the implementation of 3D shooting games, such as a fast communication network capable of multiplayer games and high-spec personal computers (PCs) capable of high-quality, real-time graphics processing, is widely available. In addition, the secret to the long-term popularity of 3D shooting games is the fun of the game genre in which players can experience various weapons, such as firearms and ammunition, together with unique hitting and sound, players can realistically experience situations, difficult to experience in real life, in a virtual environment, and players can compete with each other by establishing various strategies in response to the maps of game rounds or opponent teams.

In order to compete with an opponent in such a 3D shooting game, it is necessary to establish an appropriate strategy for every round. For example, it is necessary to select an appropriate item, to move along a safe path or engage in a battle at an advantageous location by identifying the characteristics of a map, and to predict the strategy of an opponent team.

To this end, players repeat the process of establishing a strategy required for the play of a game including the same or similar map and team while reviewing the progress of a completed game round. However, there is a problem in that it is difficult for a player to accurately remember every game process. In particular, in general 3D shooting games, game replay images are not provided, so that it is difficult to accurately review a game process. Even when some replays are provided, only highlight images are provided, so that data that allows players to review the overall play of each game round cannot be presented. In addition, conventional 3D shooting games provide neither separate replays for respective rounds nor game images of previous rounds before the end of all game rounds.

Therefore, from the perspective of players, there is a problem in that it is difficult to become aware of the overall progress of each game round of a game.

In connection with this, Korean Patent No. 10-0793311 discloses a "Method and System for Providing a Mobile Game Replay Service, and a Mobile Communication Terminal therefor." According to this related technology, a user can store a replay image for a game desired by him or her and share it with others.

However, even according to this related technology, there is a problem in that it is difficult to check the details of play for each game round of a game. In particular, it is difficult to become aware of the progress of a game for the play time of each game round, and also it is difficult to become aware of the progress of a game for all players as a whole. Accordingly, there is a problem in that it is difficult to review the progress of a completed game round in order to establish an appropriate game strategy when a similar game round is performed in the future.

Therefore, there is a need for technology for solving the above-described problems.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

An object of the embodiments disclosed herein is to present an apparatus and method for providing game replays that provide a replay image of a 3D shooting game to players in the form of a two-dimensional (2D) plan view.

Another object of the embodiments disclosed herein is to present an apparatus and method for providing game replays that mark the movement lines of all the players who participated in a game on a replay image in the form of a 2D plan view and then provide the replay image.

Another object of the embodiments disclosed herein is to present an apparatus and method for providing game replays that provide a replay image for each round for one game match divided into a plurality of rounds.

Another object of the embodiments disclosed herein is to present an apparatus and method for providing game replays that generate a separate replay image of each round and then provide the replay image to players whenever the corresponding round ends.

Another object of the embodiments disclosed herein is to present an apparatus and method for providing game replays that enable the viewing of a replay image of a completed game round at any time during a game or after the end of a game.

Another object of the embodiments disclosed herein is to present an apparatus and method for providing game replays that provide a replay image so that a player can view the replay image at a desired time or place.

As a technical solution for accomplishing the above objects, according to an embodiment, there is provided an apparatus for providing game replays, the apparatus including: storage configured to store a game log for each game round of a game match including a plurality of game rounds that are performed sequentially; a controller configured to run the game round by providing a game screen of a three-dimensional game space to a plurality of players participating in the game match and also receiving control commands for characters from the plurality of players, and to, when the game round ends, generate a replay image showing changes in the location of a character corresponding to each of the plurality of players on a two-dimensional plan view of the three-dimensional game space based on the game log of the game round; and an input/output interface configured to provide the replay image to the plurality of players.

According to another embodiment, there is provided a method of providing game replays, the method being performed by an apparatus for providing game replays, the method including: running each game round by providing a game screen of a three-dimensional game space to a plurality of players participating in a game match, including a plurality of game rounds that are performed sequentially, and also receiving control commands for characters from the plurality of players; storing the game log of the game round; when the game round ends, generating a replay image showing changes in the location of a character corresponding to each of the plurality of players on a two-dimensional plan view of the three-dimensional game space based on the game log of the game round; and providing the replay image to the plurality of players.

According to still another embodiment, there is provided a non-transitory computer-readable storage medium having stored thereon a program that, when executed by a processor, causes the processor to execute a method of providing game replays, wherein the method includes: running each game round by providing a game screen of a three-dimensional game space to a plurality of players participating in a game match, including a plurality of game rounds that are performed sequentially, and also receiving control commands for characters from the plurality of players; storing the game log of the game round; when the game round ends, generating a replay image showing changes in the location of a character corresponding to each of the plurality of players on a two-dimensional plan view of the three-dimensional game space based on the game log of the game round; and providing the replay image to the plurality of players.

According to still another embodiment, there is provided a computer program that is executed by an apparatus for providing game replays and stored in a non-transitory computer-readable storage medium in order to perform a method of providing game replays, wherein the method includes: running each game round by providing a game screen of a three-dimensional game space to a plurality of players participating in a game match, including a plurality of game rounds that are performed sequentially, and also receiving control commands for characters from the plurality of players; storing the game log of the game round; when the game round ends, generating a replay image showing changes in the location of a character corresponding to each of the plurality of players on a two-dimensional plan view of the three-dimensional game space based on the game log of the game round; and providing the replay image to the plurality of players.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component arranged therebetween." Furthermore, when one portion is described as "including" one component, this does not mean that the portion does not exclude another component but means that the portion may further include another component, unless explicitly described to the contrary.

Embodiments of the present invention will be described in detail below with reference to the accompanying drawings.

Figure 1:
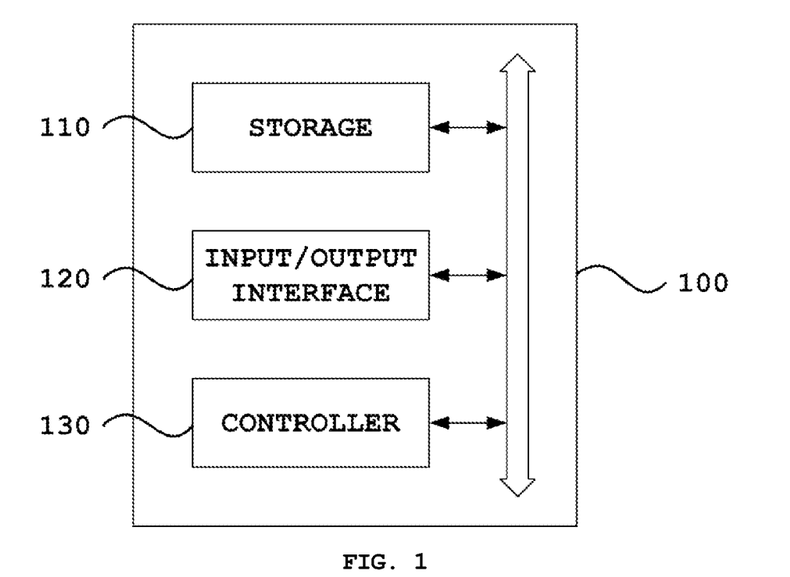
FIG. 1 is a block diagram showing the configuration of an apparatus for providing game replays according to an embodiment.

FIG. 1 is a block diagram showing the configuration of an apparatus 100 for providing game replays according to an embodiment.

In this case, the apparatus 100 for providing game replays may be implemented as a computing device that constructs game screens by executing a game program and provides a game to a player by outputting the constructed game screens. In this case, the game may be a common online game. In particular, in one embodiment, the game may be a 3D shooting game in which a friendly player and an enemy player compete with each other by attacking an opponent using items worn by each other, e.g., firearms, in a 3D game space. During the game, images in the 3D space acquired from the first-person view of the character of a player or a third-person view around the character of a player may be constructed as game screens and provided to each player.

Furthermore, in this case, the 3D shooting game may be played in the form of a game match in which friendly and enemy forces engage in a battle. Each game match may be divided into a plurality of game rounds that are performed sequentially. For example, a game match may consist of five game rounds, and may be played in such a manner that a team who wins more game rounds becomes a winning team based on the competition results of the individual game rounds. In addition, pause time having a predetermined duration may be provided between game rounds in one game match.

In this case, the apparatus 100 for providing game replays may be implemented as an electronic terminal on which an application such as a game program is installed, or may be implemented as a server-client system. When the apparatus 100 for providing game replays is implemented as a server-client system, it may include an electronic terminal on which a client for interaction with a player is installed.

In this case, the electronic terminal may be implemented as a computer, a portable terminal, a television, a wearable device, or the like that can include an interface capable of interaction with a player. In this case, the computer includes, e.g., a notebook, a desktop, a laptop, and the like each equipped with a web browser. The portable terminal is, e.g., a wireless communication device capable of guaranteeing portability and mobility, and may include all types of handheld wireless communication devices, such as a Personal Communication System (PCS) terminal, a Personal Digital Cellular (PDC) terminal, a Personal Handyphone System (PHS) terminal, a Personal Digital Assistant (PDA), a Global System for Mobile communications (GSM) terminal, an International Mobile Telecommunication (IMT)-2000 terminal, a Code Division Multiple Access (CDMA)-2000 terminal, a W-Code Division Multiple Access (W-CDMA) terminal, a Wireless Broadband (Wibro) Internet terminal, a smartphone, a Mobile Worldwide Interoperability for Microwave Access (mobile WiMAX) terminal, and the like. Furthermore, the television may include an Internet Protocol Television (IPTV), an Internet Television (Internet TV), a terrestrial TV, a cable TV, and the like. Moreover, the wearable device is an information processing device of a type that can be directly worn on a human body, such as a watch, glasses, an accessory, clothing, shoes, or the like, and can access a remote server or be connected to another terminal directly or via another information processing device over a network.

In addition, the server may be implemented as a computer capable of communicating over a network with an electronic terminal on which an application for interaction with a player or a web browser is installed, or may be implemented as a cloud computing server. Furthermore, the server may include a storage device capable of storing data, or may store data through a third server.

The configuration of the apparatus 100 for providing game replays according to the present embodiment will be described in detail below.

Referring to FIG. 1, the apparatus 100 for providing game replays according to the embodiment may include storage 110, an input/output interface 120, and a controller 130.

The storage 110 may store various types of data required for the operation of a game, such as the operating system of the apparatus 100 for providing game replays, an application for the provision of the game, and data for the management of the apparatus 100 for providing game replays. The storage 110 may further store data related to virtual 3D game spaces in which a game is played, i.e., game maps, information about various objects disposed in the game maps, images of the respective objects, information about spaces occupied by the respective objects, the names of the respective objects, and information related to the operations or movements of the objects. In this case, information about individual objects constituting each of the game spaces may include information about 3D location coordinates within the range of the finite game space.

In addition, the storage 110 may store a game log for each game round. In this case, the game log may include game progress information for each character in response to the progress time of the game round. The game progress information for the character may include data on a change in the location coordinates of each character in the game space. In other words, the game progress information for each character may include the location coordinate information of each character corresponding to the progress time of the game round.

In this case, the term "character" refers to a virtual subject that corresponds to a player and is present in a game. Such a character may be composed of, e.g., a 3D object that is active in a game space of a shooting game, and some characters may be non-player characters.

In addition, the game progress information for each character may include changes in numerical values related to the characteristics of the character such as the movement information of the character, the amount of damage that the character inflicted on an enemy character during a game round, i.e., the amount of inflicted damage, and the amount of damage that the character received from the enemy character during the game round, i.e., the amount of received damage, information about the enemy character on which the character inflicted damage or the time when the character inflicted damage on the enemy character, information about the enemy character who inflicted damage on the character or the time of the damage or the time when the enemy character inflicted damage on the character, and information about the time when the character died during the game round. Furthermore, the game progress information for each character may also include information about an item that is worn by the character and information about the time when the character used the item.

Meanwhile, the game progress information for each character continuously changes according to the progress of a game round. The storage 110 may store such changes in game progress information for each character in a game log recorded for each game round according to the progress time of the game round.

Furthermore, the storage 110 may store a replay image that is generated based on a game log. In addition, the storage 110 may extract at least partial information from the game progress information for each character included in the game log, and may store the status information of the character synchronized with the replay image.

In this case, first, the "replay image" may be generated in the form of a video. More specifically, the replay image may be composed of an image showing changes in the location of each character, extracted based on a game log, on a 2D plan view of a 3D game space in which a game round was performed. More specifically, the replay image may be generated by marking the symbol of each character at the location at which the 3D location coordinates of the character according to the progress time of a game round are projected onto a 2D plan view of a 3D game space. In this case, the symbol for each character may be a 2D object having a preset shape, and may be marked together with the nickname of the character. Furthermore, the gaze or movement direction of each character may be marked together with the corresponding symbol. In addition, not only the movement line of the character according to the progress time of the game round, but also the interaction between characters, e.g., an inflicted or received damage situation between a friendly character and an enemy character, may be visually marked in the replay image. For example, when a friendly character attacks an enemy character at a specific point in time, a visual effect of shooting or throwing a weapon from the symbol of the friendly character toward the symbol of the enemy character at that point in time may be applied to the replay image. In particular, in this case, the direction in which the weapon was moved or the point at which the weapon was thrown may be marked on the 2D plan view. In addition, the color of the visual effect may vary depending on whether the team by which the shooting or throwing of the weapon was performed is a friendly or enemy team, so that a player who views a replay image can intuitively recognize attack and damage situations. Alternatively, a visual effect of reducing the size of the symbol of an enemy character according to the amount of damage inflicted on the enemy character when damage occurs to the enemy character may be displayed in the replay image. In addition, when a character died at a specific point in time during a game round, a visual effect in which the symbol of the character disappears or the symbol of the character changes to a specific shape or color may be included in the replay image.

Meanwhile, the above-described replay image may be generated to have a playback time identical to the progress time of the game round. In other words, the replay image may be configured to comprehensively include the progress process of the game round.

In this case, the 2D plan view of the 3D game space may have a form in which the 3D location coordinates of fixed objects that do not move in the game space, e.g., objects such as a building or a geographic feature, are projected onto a 2D plane and individual objects are marked as distinguishable. For example, an object corresponding to a building and an object representing the ground outside the building may be marked in different colors on a 2D plan view. Alternatively, for example, the 2D plan view may be constructed by projecting 3D coordinates corresponding to boundaries between objects onto a 2D plane so that they are marked as lines.

Furthermore, according to an embodiment, a 2D plan view of a specific game space may be configured to include two or more distinct plan views. For example, when there is a building object composed of multiple floors in a virtual game space, two or more plan views corresponding to each floor are formed, and an object having a coordinate value other than a level corresponding to each floor may be projected onto one of plan views corresponding to each floor.

In addition, a video in which the symbol of a character moves may be generated as a replay image by projecting the location of each character onto the 2D plan view formed in the above manner and marking the symbol of the character at the location.

Furthermore, the "status information" of a character stored in synchronization with a replay image is partial data extracted from data included in game progress information for each character stored in a game log or information obtained by processing the partial data, and may be provided to players along with the replay image. More specifically, the status information is stored according to the progress time of a game round, and may include information on the item that was worn by the character, the item that was used by the character at a specific time, numerical values such as the amount of received damage of the character, the amount of inflicted damage, etc., and information about whether the character is alive or dead.

Meanwhile, the input/output interface 120 is configured to provide a game screen to a player and receive a command corresponding to the game screen from the player so that the player and the apparatus 100 for providing game replays can interact with each other. The input/output interface 120 may include an input interface configured to receive input from a player, and an output interface configured to display information or symbols required for providing a game and automatically ending the game. For example, the input/output interface 120 may include an operation panel configured to receive input from a player, a display panel configured to display screens.

More specifically, the input interface may include devices capable of receiving various types of input from a player, such as a keyboard, physical buttons, a touch screen, a camera, or a microphone. Furthermore, the output interface may include a display panel, a speaker, or a headset. However, the input/output interface 120 is not limited thereto, but may include components supporting various types of input/output.

The input/output interface 120 outputs a game screen generated using data stored in the storage 110, receives real-time commands from players, and incorporates the results processed according to the input commands back into the game screen and then outputs a resulting game screen. Accordingly, the players may play an actual game that is provided by the apparatus 100 for providing game replays.

Meanwhile, the input/output interface 120 may provide a replay image to players. When the input/output interface 120 receives a request to provide a replay image of a specific game round from a player, the input/output interface 120 may play back and display the requested replay image of the game round. In this case, the input/output interface 120 may play back the replay image from the beginning at a constant speed. Accordingly, through the replay image, the movement line of each character over time may be displayed on a 2D plan view of a game space in which the game round was performed. In addition, optionally, the interaction between characters, e.g., an inflicted or received damage situation, may be displayed in the symbol of each of the characters as a visual effect in the replay image. The time at which the character died may also be displayed as a visual effect in the replay image.

Meanwhile, the input/output interface 120 may provide playback state control menus configured to control the playback state of a replay image to one side of the replay image. Through this, the input/output interface 120 may receive a command to change a playback state from a player.

Accordingly, when the input/output interface 120 receives a request to change a playback state, e.g., a request to change a playback speed or a request to change a playback section, from a player through the playback state control menus, the input/output interface 120 may play back a replay image at a changed speed or play back a replay image from a changed point in time.

The playback state control menus may include menus configured to select a playback speed, to stop a playback state, or to resume playback. In particular, the playback state control menus may include a progressive bar indicative of a current playback time for the total playback time of a replay image. Accordingly, a player may change a playback state so that the playback section of a replay image is played back from a selected point in time by selecting a specific point in time in the progressive bar.

Furthermore, according to an embodiment, the input/output interface 120 may provide a user interface configured to allow a specific location of a 2D plan view to be selected on an area where a replay image is output. Accordingly, the input/output interface 120 may receive a selection of a specific location of a 2D plan view from a player. Therefore, the controller 130, which will be described later, may extract only a time section in which the character of a player stays within a predetermined range from location coordinates corresponding to a selected location from the overall playback time of the replay image of a corresponding game round, and may display the extracted time section on the output progressive bar output through the input/output interface 120 so that the extracted time section can be distinguished.

For example, the input/output interface 120 may mark a time section, in which the character of a player stayed within a predetermined range from a location selected by the player, in a different color on the progressive bar. Through this, the player may be prompted to select a specific point in time from the time section displayed in the different color, so that the replay image can be played from that point in time. Accordingly, the player may selectively view the replay image only for a situation in which he or she engaged in a battle at a specific location.

Meanwhile, the input/output interface 120 may output the status information of each character, stored in synchronization with the replay image, onto one side of the replay image while playing back the replay image. In this case, as described above, the status information may include information about the amount of received damage or inflicted damage up to the point in time at which the replay image of the character is played back, whether the character is alive or dead, an item which is worn, the item which is used by each character at the corresponding point in time, and/or the like. The status information of each character may be separately displayed in another area outside the area onto which the replay image is output, or may be displayed around a symbol representative of each character in the replay image. For example, the information about whether the character is alive or dead may be provided in a form in which a living character and a dead character are marked as distinct symbols in the replay image.

Meanwhile, the input/output interface 120 may provide a replay image of a completed game round during the pause time provided to players after the end of the game round, during a subsequent game round of the players, or after the end of a game match so that a player can selectively view it.

To this end, the input/output interface 120 may provide each player with a menu configured such that the player can request the provision of a replay image therethrough. For example, the input/output interface 120 may provide an item shop to each player during pause time so that he or she can select and purchase an item to wear or use during a subsequent game round. A button configured to request the playback of a replay image of a previous game round may be provided on one side of the item shop.

Alternatively, when a replay image of a previous game round is provided during a game round, the input/output interface 120 may provide a button configured to request the playback of a replay image of a previous game round on one side of the status board of the current game round. In this case, the status board is used as a term that refers to a user interface that distinguishes a friendly character from an enemy character in a current game round and provides information about the amount of received or inflicted damage which has been recorded by the character of each player up to the present time and the item which is worn or used by each character.

Furthermore, after a game match including game rounds has ended, the input/output interface 120 may provide a button configured to request the playback of a replay image of each of all the game rounds, included in the game match, in a recording room. Through this, a player may receive the replay image by selecting the button for a request for the playback of a replay image.

Meanwhile, the apparatus 100 for providing game replays may include the controller 130. The controller 130 controls the overall operation of the apparatus 100 for providing game replays, and may include a processor such as a central processing unit (CPU).

In particular, the controller 130 allows a game to be provided to a player. To this end, the controller 130 may construct a game screen to be provided to the player through the input/output interface 120, may process a command or data input from the player in response to the game screen, and may incorporate processing results into the game screen. To this end, the controller 130 may execute an application for the provision of a game stored in the storage 110, and may access and use various pieces of data stored for the execution of the game.

The controller 130 may provide a game screen generated in a 3D game space to a plurality of players participating in a game match, may receive control commands for characters from a plurality of players, and may run a game round. When the game round ends, the controller 130 generates a replay image showing changes in the location of a character corresponding to each of the plurality of players on a 2D plan view of a game space based on the game log of the corresponding game round.

During the progress of a game round, the controller 130 may construct a game screen from the point of view of a character corresponding to each player in a 3D game space or the point of view of a third person around the character of each player, and may allow the game screen to be output through the input/output interface 120. In this case, the game screen provided during the progress of the game round may be generated by rendering a game image in real time at a specific point in time by using a 3D game space and models of 3D objects disposed in the game space.

Meanwhile, the controller 130 may generate a replay image for a completed game round and store it in the storage 110. In this case, the replay image is generated differently from a game screen provided to a player during the progress of the game round. As described above, the game screen is generated through a common 3D image rendering process, such as the process of projecting models of 3D objects at a specific point in time in a 3D game space, whereas the replay image is generated based on a 2D plan view of the game space.

The controller 130 may generate a replay image by marking the symbol of each character at the locations where the 3D location coordinates of the character according to the progress time of a game round are projected onto a 2D plan view of a game space, so that the movement line of each character can be displayed in the replay image.

Furthermore, as described above, the controller 130 may allow the interaction between characters, such as an inflicted or received damage situation, to be displayed as a visual effect in a replay image. When each character uses a weapon, e.g., when each character shoots or throws a weapon, the controller 130 may display an icon distinctively representative of the type of weapon used at a corresponding point in time in a replay image, or may mark the direction or trajectory, in or along which the weapon was shot or thrown, and the location of the point, at which the final shooting or throwing was made, on a 2D plan view. In addition, when damage occurs to a specific character due to the above attack, the controller 130 may mark a damage situation as a visual effect on the symbol of the character who received the damage. Furthermore, the controller 130 may apply a visual effect representative of death to the symbol of a character at the point in time when the character died.

As described above, in order to generate a replay image, the controller 130 may refer to the game log of a game round stored in the storage 110. By referring to game progress information for each character recorded in the game log, the movement line of each character may be marked on a 2D plan view, and information about whether damage was received or inflicted by a battle between characters may be marked at the point in time at which the battle occurred.

Furthermore, the controller 130 may allow the status information of each character, not displayed in a replay image, to be separately stored in synchronization with the replay image. For example, information about an item worn or used by each character, or a specific numerical value, such as the amount of cumulative inflicted or received damage for each character according to the progress time of a game round, may be stored as the status information.

Accordingly, when the replay image is played back later, the status information for each character may be output to one side of the replay image while changing in synchronization with the playback time of the replay image.

Furthermore, according to an embodiment, in the generation of a replay image, when a specific effect occurred in a specific area of a 3D game space during the progress of a game round, the controller 130 may display the specific effect in the replay image. The controller 130 may mark a specific area on a 2D plan view at a location corresponding to the corresponding area so that the specific area can be distinguished from the remaining area while the corresponding effect continues. For example, the corresponding area may be displayed in a specific color having transparency so that the corresponding area can be distinguished from the remaining area. In this case, when the range of the area to which a specific effect is applied is changed according to the progress of the game round, the change in the area may also be marked on a 2D plan view of the replay image.

In this case, a game effect applied to a specific area may be an effect that affects the physical strength of a character located in the corresponding area, such as a "magnetic field" applied to an FPS game. Alternatively, it may be an effect that affects whether an item used by a character located in the corresponding area is available, that affects performance, or that strengthens or weakens some ability of the character. The controller 130 may display the area to which the above effect is applied on a 2D plan view of a replay image so that it can be distinguished from the remaining area and may also display changes in the area according to the progress of the game round, so that a player viewing the replay image can easily become aware of the movement of the symbol of each character or the context of the play.

A method of providing game replays that is performed by the above-described apparatus 100 for providing game replays will be described below.

Figure 2:
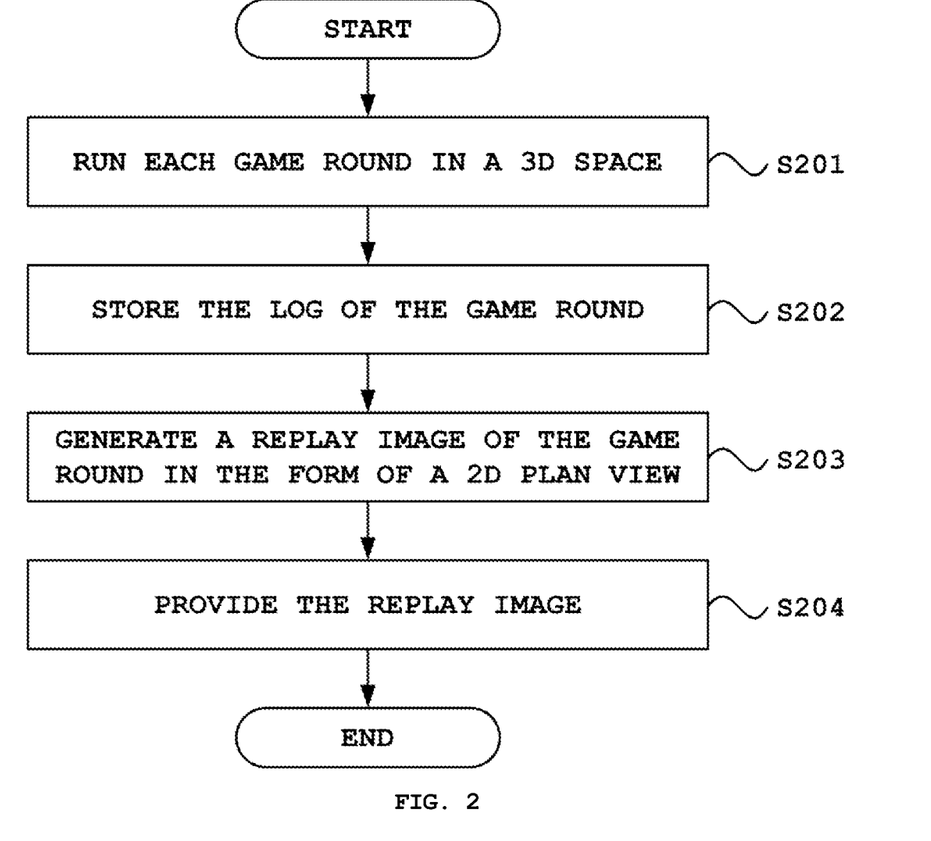
FIG. 2 is a flowchart showing a method of providing game replays according to an embodiment in a stepwise manner.
Figure 3:
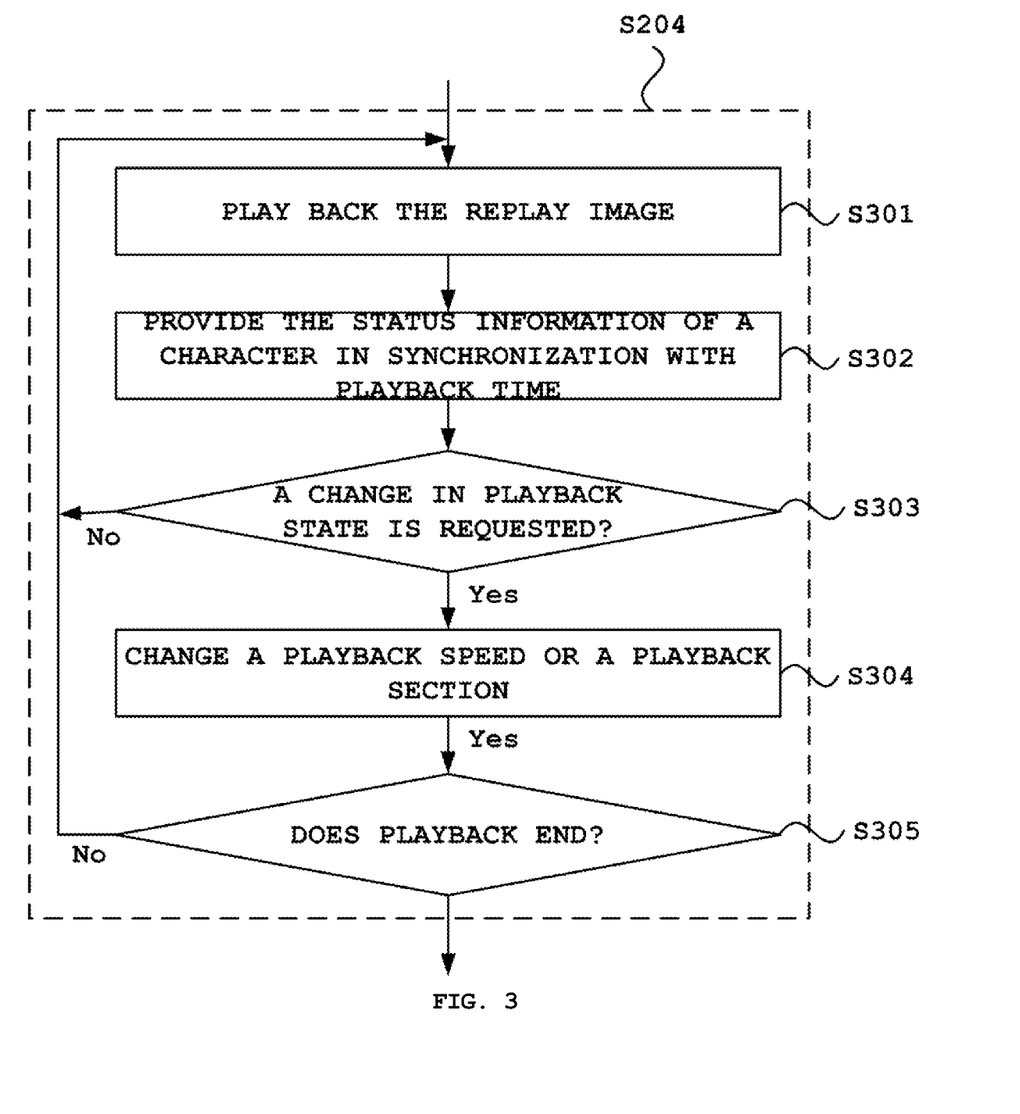
FIG. 3 is a flowchart specifically showing an embodiment of step S204 of the method of providing game replays shown in FIG. 2.
Figure 4:
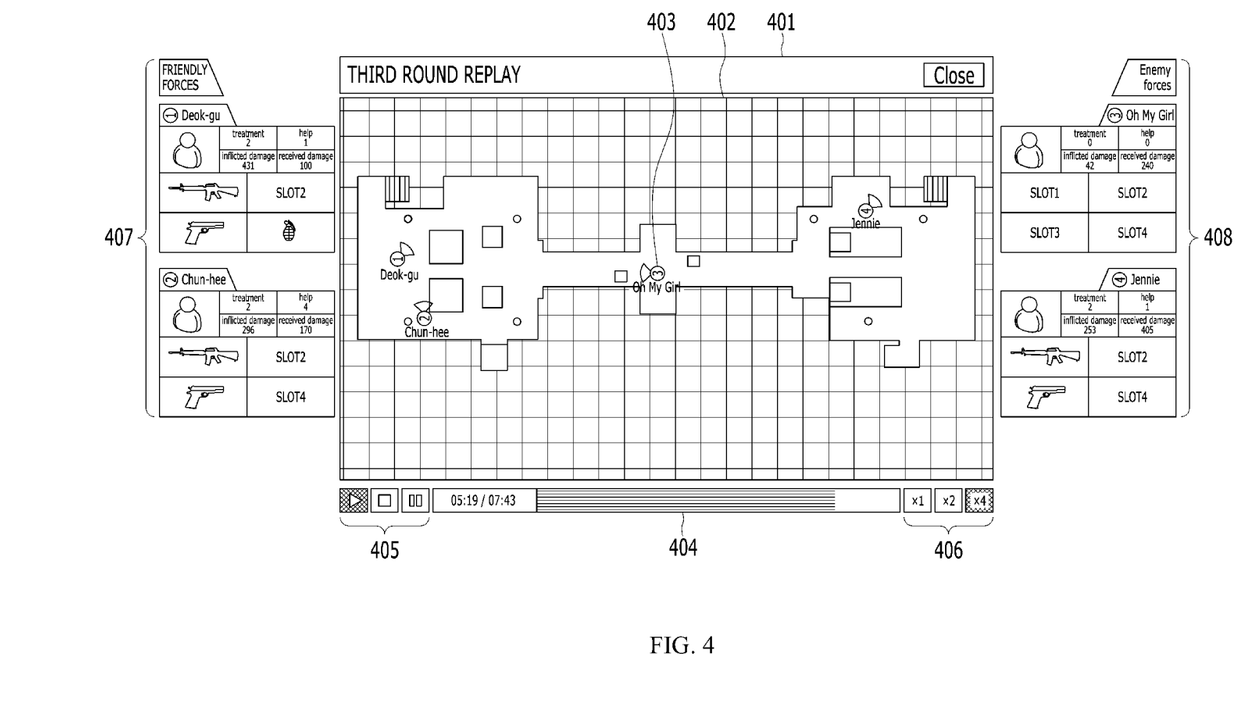
FIGS. 4 to 7 are exemplary diagrams specifically illustrating user interfaces provided to players according to the method of providing game replays shown in FIG. 2.
Figure 5:
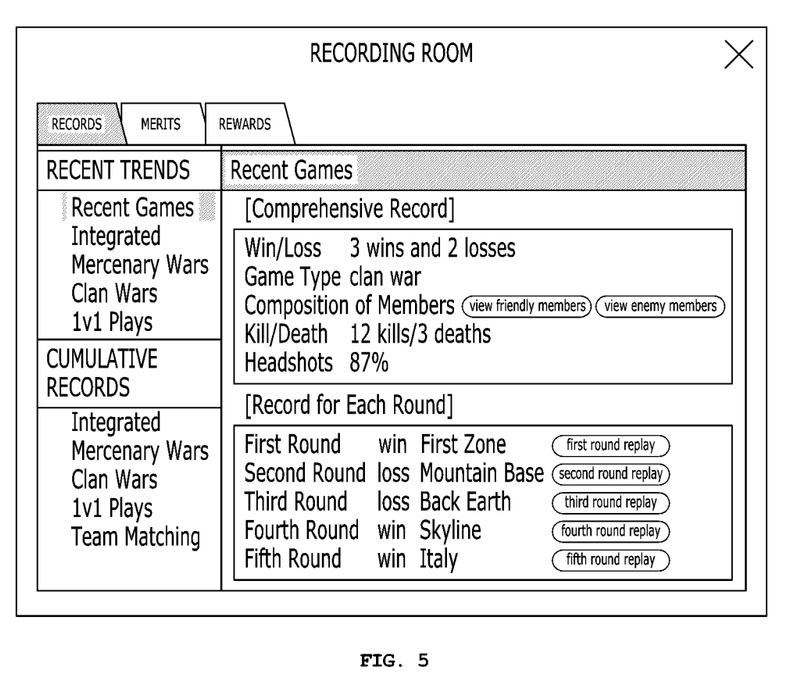

FIG. 2 is a flowchart showing a method of providing game replays according to an embodiment in a stepwise manner, FIG. 3 is a flowchart specifically showing an embodiment of step S204 of the method of providing game replays shown in FIG. 2, and FIGS. 4 and 5 are exemplary diagrams specifically illustrating user interfaces provided to players according to the method of providing game replays shown in FIG. 2.

The method of providing game replays according to the embodiments shown in FIGS. 2 and 3 includes steps that are processed in a time-series manner by the apparatus 100 for providing game replays shown in FIG. 1. Accordingly, the descriptions that are omitted below but have been given above in conjunction with the apparatus 100 for providing game replays shown in FIG. 1 may also be applied to the method of providing game replays according to the embodiments shown in FIGS. 2 and 3.

First, referring to FIG. 2, the apparatus 100 for providing game replays may run a game round while providing a game screen in a 3D game space to each of a plurality of players participating in a game match in step S201. One game match may include a plurality of game rounds. According to an embodiment, the pause time during which an item shop is provided may be given after one game round has ended and until a subsequent game round starts.

Meanwhile, during the performance of a game round, a game screen provided to each player by the apparatus 100 for providing game replays may be constructed in real time by rendering models of respective 3D objects disposed in a game space at a specific point in time.

In addition, the apparatus 100 for providing game replays may run a game by receiving commands from players and then processing the commands on the above game screen.

In this case, the apparatus 100 for providing game replays may record a game log during the progress of a game round in step S202. In this case, the game log may include game progress information for each character. For example, the game log may also include information about the movement of a character, changes in numerical values related to the characteristics of the character such as the amount of damage which the character inflicted on an enemy character during the progress of the game round, i.e., the amount of inflicted damage, and the amount of damage which the character received from an enemy character during the progress of the game round, i.e., the amount of received damage, information about an enemy character on which the character inflicted damage or the time when the character inflicted damage on the enemy character, information about an enemy character who inflicted damage on the character or the time when the enemy character inflicted damage on the character, information about the time when a character died during the game round, etc. Furthermore, the game progress information for each character may record an item which was worn by the character, information about the time when the character used an item, and the like as a game log.

Meanwhile, when the game round ends, the apparatus 100 for providing game replays may generate a replay image of the game round in the form of a 2D plan view of a 3D game space in which the game round was performed in step S203. More specifically, the controller 130 may generate a replay image by marking the symbol of each character at locations where the 3D location coordinates of the character according to the progress time of the game round are projected onto a 2D plan view of a game space.

In this case, a 2D plan view of each game space may be stored in advance for the game space. Alternatively, the apparatus 100 for providing game replays may construct a 2D plan view using the data of a 3D game space. For example, the apparatus 100 for providing game replays may construct a 2D plan view by projecting models of 3D objects disposed in each game space onto one plane and displaying individual objects or the boundaries thereof in different colors so that they can be distinguished from each other. Planar coordinates corresponding to the spatial coordinates of the 3D game space may be allocated to the 2D plan view. Accordingly, a specific location in the 3D game space may be projected onto a specific location on the 2D plan view. For example, the location of a character in the 3D game space may be converted into a corresponding location on a 2D plan view.

Accordingly, the apparatus 100 for providing game replays may generate a replay image so that the movement line of each character identified based on the game log can be marked on the 2D plan view.

Furthermore, the apparatus 100 for providing game replays may display an interaction for each character, e.g., a received or inflicted damage situation attributable to a battle, in a replay image as a visual effect based on the game log. For example, when a specific character attacks another character, the apparatus 100 for providing game replays may provide a visual effect of shooting or throwing a weapon from the symbol of the specific character to the symbol of the other character onto a 2D plan view at that point in time. According to an embodiment, such a visual effect representative of a received or inflicted damage situation may be preset to vary depending on the type of item that caused received or inflicted damage.

Furthermore, the apparatus 100 for providing game replays may mark an interaction between friendly characters, e.g., a treatment or item supply situation, other than a received or inflicted damage situation, as a visual effect in a replay image at the time when the interaction occurred.

Furthermore, the apparatus 100 for providing game replays may mark the time when a character died as a visual effect in a replay image.

Furthermore, when an effect such as a magnetic field occurs in a specific area of a 3D game space, the apparatus 100 for providing game replays may mark an area to which the above effect is applied and an area to which the above effect is not applied in different colors on a 2D plan view of a replay image so that they can be distinguished from each other. In particular, when the range of the above area changes according to the progress of a game round, the apparatus 100 for providing game replays may store a game log for the change in the area during the actual game round, and may allow the change in the area to which the above effect is applied to appear in the replay image at the same time.

Meanwhile, the apparatus 100 for providing game replays may store a change in the specific status information of each character that is not represented in a replay image in synchronization with the replay image. In this case, the apparatus 100 for providing game replays may extract the status information of the character from a game log relevant to a corresponding game round, and may store it in synchronization with the replay image.

Accordingly, while the replay image is being played back, status information for each character may be displayed on one side of the replay image according to the playback time of the replay image.

In addition, the apparatus 100 for providing game replays may provide the generated replay image to players in step S204.

In step S204, more specifically, the apparatus 100 for providing game replays may play back the replay image as shown in FIG. 3 (see step S301).

In this case, the apparatus 100 for providing game replays may play back a replay image using, e.g., a user interface as shown in FIG. 4.

When receiving a request to play back a replay image from a player, the apparatus 100 for providing game replays may display a replay area 401 and then display the replay image in the replay area 401. In this case, it can be seen that the symbol 403 of each character is displayed in the replay image with a 2D plan view 402 of a game space as the background thereof.

The color of the symbol 403 of each character may vary depending on whether the character is a friend or an enemy, or different colors may be allocated to respective characters.

In the example shown in FIG. 4, it can be seen that the colors of the symbols of friendly and enemy forces are distinguished from each other and different numbers are allocated to respective characters to distinguish the characters from each other.

Furthermore, the nickname of each character may be displayed near the symbol of the character.

Furthermore, FIG. 4 illustrates an example in which the point of view of a character is shown around the symbol of the character. In addition, the actions of characters, such as hitting, or received and inflicted damage situations between characters may be represented as visual effects.

Meanwhile, a progressive bar 404 indicating the playback time of a replay image provided in the form of a video with a 2D plan view as the background thereof may be provided on one side of the replay image. The progressive bar 404 may be configured to indicate the current playback time for the total playback time of the replay image, and a specific time may be displayed in the form of text as illustrated.

In this case, the apparatus 100 for providing game replays may enable a player to select and input a point in time for the progressive bar 404 so that the player can change a playback section by moving a cursor indicative of the current playback time of the progressive bar 404.

Furthermore, the apparatus 100 for providing game replays may provide playback state control menus 405 and 406 for changing the playback state of a replay image. For example, a button 405 for playback, the stop of playback, or pause, and playback speed selection buttons 406 may be provided.

Furthermore, as shown in FIG. 4, the apparatus 100 for providing game replays may display the status information 407 of friendly characters and the status information 408 of enemy characters on either side of the replay area 401. In this case, the status information 407 and 408 may include the name and image of each character, and may correspondingly include the type of an item worn, the type of item being used at a specific point in time, the amount of received or inflicted damage, and the number of treatments or helps.

Meanwhile, although the pieces of status information of friendly and enemy characters are illustrated as including the same information as illustrated in FIG. 4, the type or amount of information included in the status information of each character may vary depending on whether the character is a friendly or enemy character.

Meanwhile, referring back to FIG. 3, the apparatus 100 for providing game replays may provide the status information of each character in synchronization with the playback time of the replay image in step S302 while playing back the replay image in step S301. As shown in FIG. 4, the apparatus 100 for providing game replays may provide the status information 407 of the friendly characters on one side of the image, and may output the status information 408 of the enemy characters onto the other side of the image. In this case, since the status information is synchronized with the playback time of the replay image as described above, it may continuously vary as playback progresses.

In addition, the apparatus 100 for providing game replays may receive a request to change the playback state from a player during the playback of the replay image in step S303.

For example, a change in the playback state may be requested by inputting a selection of a point in time by a player for the progressive bar 404 shown in FIG. 4 or by selecting one of the playback state control menus 405 and 406.

Accordingly, the apparatus 100 for providing game replays may control the playback state by changing a playback section so that the apparatus 100 for providing game replays can play back the replay image from a point in time selected on the progressive bar 404 or by changing a playback speed in step S304.

Furthermore, the apparatus 100 for providing game replays may implement a user interface configured to enable the location of a player on a 2D plan view displayed on the replay image to be selected in the replay area 401 and then provide the interface to the player according to an embodiment. Accordingly, the player can select a specific location on the replay image to be played back. In this case, the apparatus 100 for providing game replays may check the location coordinates of the 2D plan view corresponding to the location selected by the player, and may extract a time section in which the character corresponding to the player had stayed within a predetermined distance from the extracted location coordinates during the playback time of the replay image. In addition, the apparatus 100 for providing game replays may mark the extracted time period in a different color on the progressive bar 404. For example, when the player designates a specific location, e.g., a location corresponding to the inside of an arsenal, on the 2D plan view, the apparatus 100 for providing game replays may extract information about a time section in which the location coordinates of the character of the corresponding player had stayed within the location range corresponding to the arsenal. Then, the extracted time section may be distinguishably marked on the progressive bar 404. Accordingly, when the player selects a distinct specific time section or point in time, the apparatus 100 for providing game replays may control the playback state of the replay image so that the replay image is played back from the selected time.

In addition, the apparatus 100 for providing game replays may repeat the above-described steps S301 to S304 until the playback of the replay image is completed or a request to stop the playback of the image is received from a player and thus the playback of the replay image ends in step S305.

Meanwhile, when providing the replay image to the players in step S204, the apparatus 100 for providing game replays may provide a button configured to request the playback of the replay image so that players participating in a game match can selectively view the replay image during the pause time provided after the end of a corresponding game round. For example, a replay image playback request button may be provided on one side of the item shop.

Accordingly, players may view the replay image during the pause time, may determine the types of items which they need, and may purchase them at the item shop.

Furthermore, the apparatus 100 for providing game replays may view a replay image of a previous game round through the status board during the progress of a subsequent game round. In this case, when the subsequent game round is being played in the same game space, the player may identify the tactics used by the enemy forces in the previous round, and may appropriately respond in the current round.

Furthermore, the apparatus 100 for providing game replays may allow each player to view a replay image for each game round included in a game match in a recording room after the end of the game match. To this end, the apparatus 100 for providing game replays may provide a button configured to receive a request to provide a replay image for each round of a game match in the recording room.

FIG. 5 illustrates the user interface of a recording room that is provided to a player. Referring to FIG. 5, on the user interface 501 of the recording room, a player may request the provision of a record of a completed game match. Accordingly, the apparatus 100 for providing game replays may provide a comprehensive record 502 of all game rounds for a specific game match and a record 503 for each round.

In addition, the record 503 for each round may include information about whether friendly forces to which a player belongs won or lost each round, the type of game space in which each game round was performed, and the like. In particular, a button configured to request the provision of a replay image of each game round may be provided in the record 503 for each round. Accordingly, the player may click a button configured to request a replay image of a specific round. Furthermore, for example, when a replay image of a third round is requested, a user interface such as that shown in FIG. 4 may be provided to a player.

Figure 6:
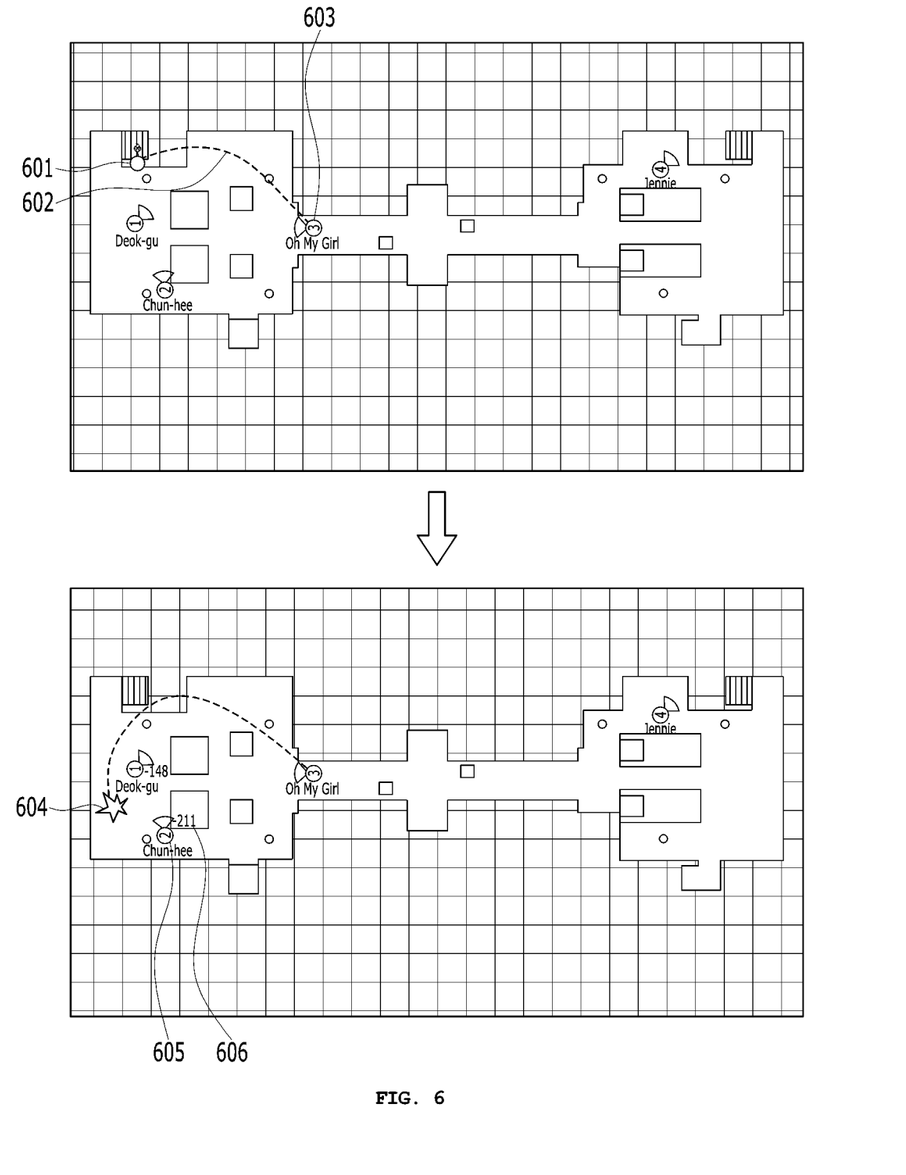

Meanwhile, according to an embodiment, the apparatus 100 for providing game replays may apply a graphic effect indicative of a battle situation between the characters of players to the replay image, as shown in FIG. 6. For example, when an item classified as a throwing weapon was used during the progress of a game round, a throwing trajectory 602 may be marked along with a weapon icon 601 indicative of the type of throwing weapon on a 2D plan view at a point in time when the item was used. In this case, for example, the throwing trajectory 602 may be extended from the symbol 603 of an attaching character having used a corresponding item to a throwing point 604 in a stepwise manner.

In addition, when the throwing weapon icon 601 reaches the throwing point 604, a graphic effect of marking a damage situation on the symbol 605 of a character who was damaged during a game round due to a thrown weapon may be applied, or the amount of damage 606 may be marked in a numerical form as illustrated in FIG. 6.

Figure 7:
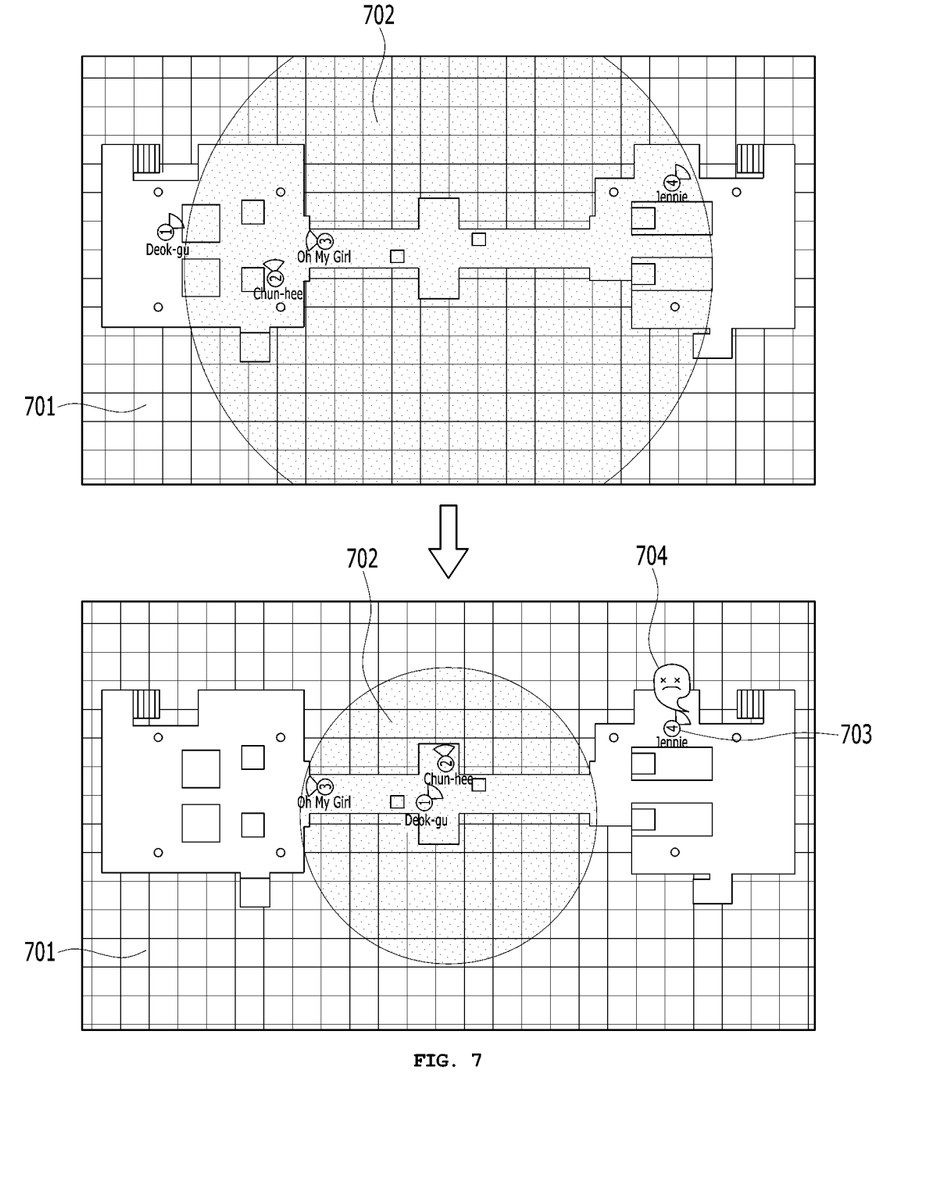

Furthermore, according to still another embodiment, as shown in FIG. 7, when a log in which a game effect was applied to a specific area during a game round was recorded, the apparatus 100 for providing game replays may display the area to which the game effect was applied on a 2D plan view of a replay image so that the area can be distinguished from the remaining area.

In the replay image illustrated in FIG. 7, for example, it can be seen that a magnetic field area 701 to which a magnetic field effect was applied is marked in blue so that the magnetic field area 701 can be distinguished from a safe area 702 to which the magnetic field effect was not applied. Furthermore, when the magnetic field area is moved or the range of the magnetic field area is expanded or reduced as a game round progresses, the magnetic field area may be displayed while changing over time even in the replay image, as shown in FIG. 7. In FIG. 7, it can be seen that the magnetic field area, which had remained relatively on the outer sides of a screen, and was moved to the central region of a game space and enlarged over time. Accordingly, the symbols of player characters are marked as moved to the safe area 702 that is not subjected to the magnetic field effect. Meanwhile, in this embodiment, the damage situation of a character due to a magnetic field effect may be marked as, e.g., an increase in a number indicative of the amount of damage on one side of the character symbol outside the safe area 702.

Meanwhile, as shown in FIG. 7, when the character of a specific player died during the progress of a game round, the apparatus 100 for providing game replays may display a graphic effect 704 indicative of the death of the character on one side of the symbol 703 of the dead character.

As described above, in one embodiment, the apparatus 100 for providing game replays displays the movement lines of all players and the interactions between the players in a replay image with a 2D plan view of a game space as the background thereof so that a player can become comprehensively aware of the combat situation of a corresponding game round while providing the replay image for each game round. Accordingly, the apparatus 100 for providing game replays allows the player to analyze a completed game round as well as to simply view the activities of the character of the player such as game highlights.

In particular, since a play becomes comprehensively aware of all the battle situations between friendly and enemy players, it may be possible to provide replay efficient for the tactical analysis of a 3D shooting game played as a team competition.

Furthermore, the characteristics of the topographical features of a battlefield may be identified, so that an advantageous location can be occupied in a later battle. In addition, the present invention may help to improve game strategy or tactics by identifying a player's own mistakes and paying attention later, or by identifying the types of items to be secured in a subsequent game while reviewing battle situations.

In particular, a replay image may be viewed for each game round, and a replay image of a completed game round may be viewed even before the end of a game match, thereby helping to prepare for a subsequent round.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more central processing units (CPUs) in a device or secure multimedia card.

The method of providing game replays according to the embodiments descried through FIGS. 2 and 3 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method of providing game replays according to the embodiments descried through FIGS. 2 and 3 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method of providing game replays according to the embodiments descried through FIGS. 2 and 3 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

According to any one of the above-described solutions, the embodiments disclosed herein may present the apparatus and method for providing game replays that provide a replay image of a 3D shooting game to players in the form of a 2D plan view.

The embodiments disclosed herein may present the apparatus and method for providing game replays that mark the movement lines of all the players who participated in a game on a replay image in the form of a 2D plan view and then provide the replay image.

The embodiments disclosed herein may present the apparatus and method for providing game replays that provide a separate replay image for each round for one game match divided into a plurality of rounds.

The embodiments disclosed herein may present the apparatus and method for providing game replays that generate a replay image of each round and then provide the replay image to players whenever the corresponding round ends.

The embodiments disclosed herein may present the apparatus and method for providing game replays that enable the viewing of a replay image of a completed game round at any time during a game or after the end of a game.

The embodiments disclosed herein may present the apparatus and method for providing game replays that provide a replay image so that a player can view the replay image at a desired time or place.

The effects that can be obtained by the embodiments disclosed herein are not limited to the effects described above, and other effects not described above will be clearly understood by those having ordinary skill in the art, to which the present invention pertains, from the foregoing description.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. An apparatus for providing game replays, the apparatus comprising:
   storage configured to store a game log for each game round of a game match including a plurality of game rounds that are performed sequentially;
   a controller configured to run the game round by providing a game screen of a three-dimensional game space to a plurality of players participating in the game match and also receiving control commands for characters from the plurality of players, and to, when the game round ends, generate a replay image showing changes in a location of a character corresponding to each of the plurality of players on a two-dimensional plan view of the three-dimensional game space based on the game log of the game round; and
   an input/output interface configured to provide the replay image to the plurality of players,
   wherein the controller generates the replay image by marking a symbol of each character at locations where three-dimensional location coordinates of the character according to a progress time of the game round are projected onto the two-dimensional plan view, and stores changing status information of each character including at least one of an item worn, an item used, an amount of inflicted damage, an amount of received damage, and whether the character is alive or dead in the storage in synchronization with a playback time of the replay image corresponding to the progress time of the game round.

2. The apparatus of claim 1, wherein:
   the game is a three-dimensional shooting game;
   after a completion of the game match, the controller allows a replay image generated for each of the plurality of game rounds, together with a record of the game match, to be selected and provided to the plurality of players so that the plurality of players can play back the replay image; and
   the input/output interface provides a replay image of a game round selected by a player so that the player can view the replay image.

3. The apparatus of claim 1, wherein the input/output interface provides the status information of the character in synchronization with the playback time of the replay image while playing back and displaying the replay image to a player who has requested playback of the replay image.

4. The apparatus of claim 1, wherein:
   the input/output interface plays back and displays the replay image to the player who has requested playback of the replay image, and also provides playback state control menus configured to control a playback state of a replay image on one side of the replay image; and
   the controller changes at least one of a playback speed and playback section of the replay image in response to an input of the player to the playback state control menus, and then plays back the replay image.

5. The apparatus of claim 4, wherein:
   the playback state control menus are configured to include a progressive bar indicative of a current playback time for a total playback time of the replay image; and
   the controller is configured to change the playback section of the replay image in response to a selection of a location by the player in the progressive bar or a selection of a location by the player on the two-dimensional plan view of the replay image.

6. A method of providing game replays, the method being performed by an apparatus for providing game replays, the method comprising:
   running each game round by providing a game screen of a three-dimensional game space to a plurality of players participating in a game match, including a plurality of game rounds that are performed sequentially, and also receiving control commands for characters from the plurality of players;
   storing a game log of the game round;
   when the game round ends, generating a replay image showing changes in a location of a character corresponding to each of the plurality of players on a two-dimensional plan view of the three-dimensional game space based on the game log of the game round; and
   providing the replay image to the plurality of players,
   wherein generating the replay image comprises:
   generating the replay image by marking a symbol of each character at locations where three-dimensional location coordinates of the character according to a progress time of the game round are projected onto the two-dimensional plan view; and
   storing changing status information of each character including at least one of an item worn, an item used, an amount of inflicted damage, an amount of received damage, and whether the character is alive or dead in synchronization with a playback time of the replay image corresponding to the progress time of the game round.

7. The method of claim 6, wherein:
   the game is a three-dimensional shooting game;

the game match is played with a pause time provided between two adjacent ones of the plurality of game rounds; and providing the replay image comprises providing a replay image of a recently completed game round during the pause time so that the plurality of players can view the replay image.

8. The method of claim 7, wherein providing the replay image comprises providing an item shop where the plurality of players can purchase items to be used in a subsequent game round to the plurality of players during the pause time while providing a replay image of a recently completed game round during the pause time so that the plurality of players can view the replay image.

9. The method of claim 6, wherein providing the replay image comprises:

playing back and displaying the replay image to a player who has requested playback of the replay image;

providing the status information of the character in synchronization with the playback time of the replay image; and changing a playback state of the replay image according to a request from the player.

10. The method of claim 9, wherein providing the replay image comprises:

receiving a selection of one of replay images corresponding to the plurality of respective game rounds, included in the game match, from a player; and playing back and displaying the selected replay image.

11. A non-transitory computer-readable storage medium having stored thereon a program that, when executed by a processor, causes the processor to execute the method of providing game replays set forth in claim 7.

12. A computer program that is executed by an apparatus for providing game replays and stored in a non-transitory computer-readable storage medium in order to perform the method of providing game replays set forth in claim 7.

* * * * *